US012719136B2

(12) United States Patent
Park

(10) Patent No.: US 12,719,136 B2
(45) Date of Patent: Aug. 25, 2026

(54) BATTERY MODULE HAVING IMPROVED ELECTRODE LEAD CONNECTION STRUCTURE, AND BATTERY PACK AND VEHICLE INCLUDING SAME

(71) Applicant: LG ENERGY SOLUTION, LTD., Seoul (KR)

(72) Inventor: Jun-Hee Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 702 days.

(21) Appl. No.: 17/908,193

(22) PCT Filed: Aug. 13, 2021

(86) PCT No.: PCT/KR2021/010836
§ 371 (c)(1),
(2) Date: Aug. 30, 2022

(87) PCT Pub. No.: WO2022/035294
PCT Pub. Date: Feb. 17, 2022

(65) Prior Publication Data
US 2023/0134549 A1 May 4, 2023

(30) Foreign Application Priority Data
Aug. 13, 2020 (KR) ........................ 10-2020-0101956

(51) Int. Cl.
*H01M 50/516* (2021.01)
*H01M 50/211* (2021.01)
*H01M 50/557* (2021.01)

(52) U.S. Cl.
CPC ....... *H01M 50/516* (2021.01); *H01M 50/211* (2021.01); *H01M 50/557* (2021.01); *H01M 2220/20* (2013.01)

(58) Field of Classification Search
None
See application file for complete search history.

(56) References Cited

U.S. PATENT DOCUMENTS

2013/0344379 A1* 12/2013 Yang .................... B23K 26/323 429/158
2015/0214553 A1 7/2015 Yoo et al.
(Continued)

FOREIGN PATENT DOCUMENTS

CN 107925028 A 4/2018
CN 111247665 A 6/2020
(Continued)

OTHER PUBLICATIONS

European Search Report for European Application No. 21856300.5, dated May 15, 2024.
(Continued)

*Primary Examiner* — Ula C Ruddock
*Assistant Examiner* — Maria F Orozco
(74) *Attorney, Agent, or Firm* — Birch, Stewart, Kolasch & Birch, LLP

(57) ABSTRACT

Discussed is a battery module including: a cell stack including a first battery cell including a first electrode lead and a second battery cell including a second electrode lead; a bus bar frame including a pair of lead slits through which the first electrode lead and the second electrode lead pass, respectively; and a bus bar fixed to the bus bar frame, wherein the first electrode lead and the second electrode lead are located on the bus bar in a state where a longitudinal end portion of the first electrode lead and a longitudinal end portion of the second electrode lead are engaged with each other, and a welding portion for bonding the first electrode lead and the second electrode lead to the bus bar is formed
(Continued)

in a region where the first electrode lead and the second electrode lead are engaged with each other.

14 Claims, 7 Drawing Sheets

(56) References Cited

U.S. PATENT DOCUMENTS

| | | | | |
|---|---|---|---|---|
| 2017/0343615 | A1 | 11/2017 | Lee et al. | |
| 2018/0194235 | A1 | 7/2018 | Kim et al. | |
| 2020/0075913 | A1* | 3/2020 | Wang | B23K 15/0046 |
| 2020/0303710 | A1 | 9/2020 | Jung et al. | |
| 2020/0368855 | A1 | 11/2020 | Kim et al. | |
| 2021/0043908 | A1 | 2/2021 | Nagafuchi et al. | |
| 2021/0083254 | A1 | 3/2021 | You et al. | |
| 2021/0091350 | A1* | 3/2021 | Yoon | H01M 50/50 |
| 2021/0313657 | A1* | 10/2021 | Park | H01M 50/211 |

FOREIGN PATENT DOCUMENTS

| | | | | |
|---|---|---|---|---|
| EP | 3 637 502 | A1 | 4/2020 | |
| EP | 3 671 902 | A1 | 6/2020 | |
| JP | 2007-26907 | A | 2/2007 | |
| JP | 2019-160736 | A | 9/2019 | |
| KR | 10-2012-0139590 | A | 12/2012 | |
| KR | 10-2014-0084563 | A | 7/2014 | |
| KR | 10-2015-0089716 | A | 8/2015 | |
| KR | 10-2016-0077762 | A | 7/2016 | |
| KR | 10-2016-0097013 | A | 8/2016 | |
| KR | 10-2017-0032098 | A | 3/2017 | |
| KR | 10-2018-0113813 | A | 10/2018 | |
| KR | 20180119372 | A * | 11/2018 | H01M 2/206 |
| KR | 10-2020-0040619 | A | 4/2020 | |
| KR | 10-2020-0058207 | A | 5/2020 | |
| KR | 10-2105665 | B1 | 5/2020 | |
| WO | WO-2020022735 | A1 * | 1/2020 | H01M 50/502 |
| WO | WO-2020075988 | A1 * | 4/2020 | H01M 50/209 |

OTHER PUBLICATIONS

International Search Report (PCT/ISA/210) issued in PCT/KR2021/010836, dated Nov. 23, 2021.

* cited by examiner

FIG. 4
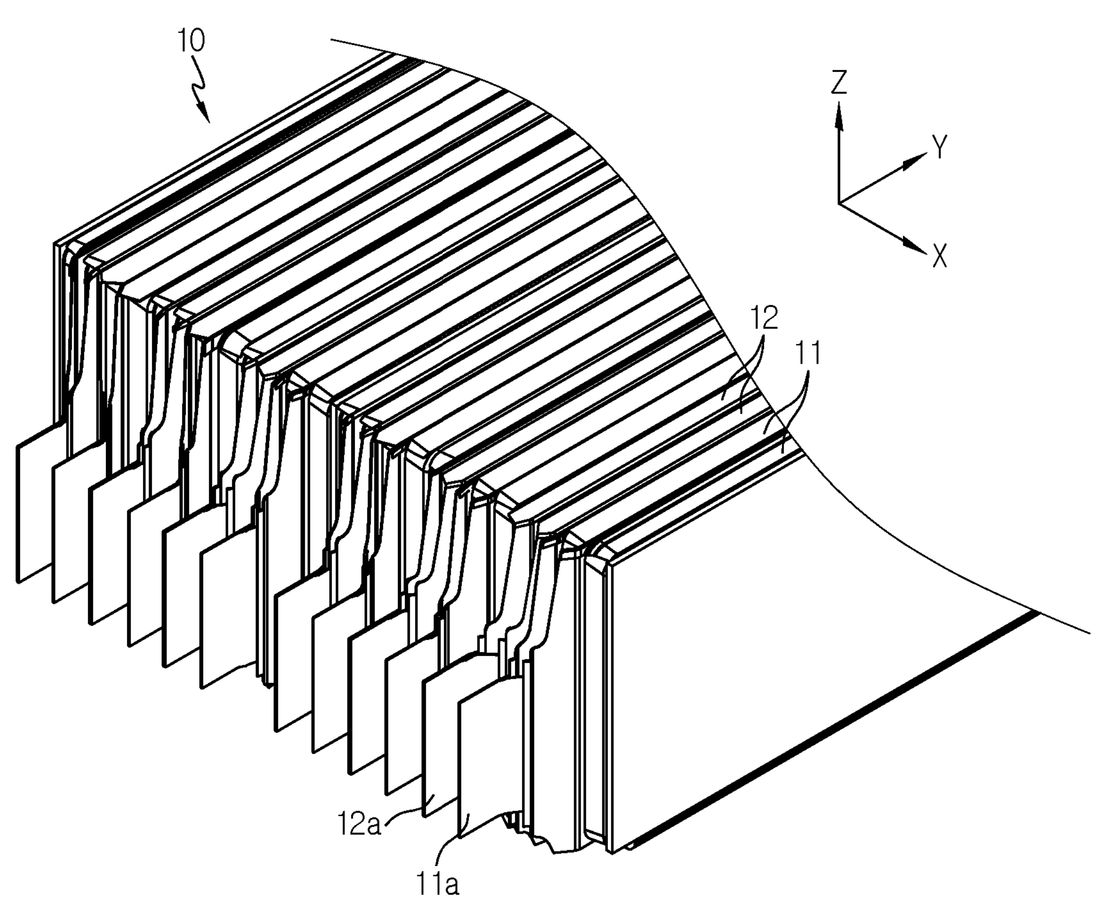

BATTERY MODULE HAVING IMPROVED ELECTRODE LEAD CONNECTION STRUCTURE, AND BATTERY PACK AND VEHICLE INCLUDING SAME

TECHNICAL FIELD

The present disclosure relates to a battery module including an improved electrode lead connection structure, and a battery pack and a vehicle including the battery module, and more particularly, to a battery module in which a shape of an electrode lead is changed to minimize the amount of use of a bus bar, and a battery pack and a vehicle including the battery module.

The present application claims priority to Korean Patent Application No. 10-2020-0101956 filed on Aug. 13, 2020 in the Republic of Korea, the disclosures of which are incorporated herein by reference.

BACKGROUND ART

A bus bar frame 2 including a bus bar 3 is generally used to electrically connect a plurality of pouch-type battery cells constituting a cell stack. In this case, an electrode lead 1 of each of adjacent pouch-type battery cells passes through a lead slit 2*a* formed in the bus bar frame 2, and a pair of electrode leads 1 passing through the lead slits 2*a* are welded to the bus bar 3 formed of a conductive material and fixed to the bus bar frame 2. Accordingly, the adjacent battery cells are electrically connected to each other.

In this case, the bus bar 3 includes a pair of plates 3*a* that are branched so that the pair of electrode leads 1 are respectively coupled to the pair of plates 3*a*.

As such, when one pair of electrode leads 1 are electrically connected to each other by using the bus bar 3 including one pair of branched plates 3*a*, as many plates 3*a* as the electrode leads 1 are required, thereby inevitably increasing manufacturing costs. Also, when one pair of electrode leads 1 are coupled to one pair of divided plates 3*a* in a one-to-one manner, a length of a path of current flowing between the one pair of electrode leads 1 increases and a resistance value increases, thereby increasing the risk of energy loss.

Accordingly, there is a need for structural improvement to improve a structure to minimize the amount of use of an expensive conductive metal material of the bus bar 3 and minimize a path of current flowing between a pair of adjacent electrode leads 1.

DISCLOSURE

Technical Problem

The present disclosure is designed to solve the problems of the related art, and therefore the present disclosure is directed to, when battery cells are electrically connected to one another, minimizing the amount of a conductive metal material required to manufacture a bus bar by minimizing a coupling area between the bus bar and an electrode lead while maintaining a sufficient coupling force, and thus reducing battery module manufacturing costs.

The present disclosure is also directed to preventing energy loss due to an increase in resistance by minimizing a path of current flowing between a pair of electrode leads electrically connected through one bus bar.

However, technical problems to be solved by the present disclosure are not limited to the above-described technical problems and one of ordinary skill in the art will understand other technical problems from the following descriptions.

Technical Solution

A battery module according to an embodiment of the present disclosure includes: a cell stack including a first battery cell including a first electrode lead and a second battery cell including a second electrode lead, the second battery cell being adjacent to the first battery cell; a bus bar frame including a pair of lead slits through which the first electrode lead and the second electrode lead pass, respectively; and a bus bar fixed to the bus bar frame, wherein the first electrode lead and the second electrode lead are located on the bus bar in a state where a longitudinal end portion of the first electrode lead and a longitudinal end portion of the second electrode lead are engaged with each other, and a welding portion for bonding the first electrode lead and the second electrode lead to the bus bar is formed in a region where the first electrode lead and the second electrode lead are engaged with each other.

The first electrode lead may include a plurality of first protrusions extending from the longitudinal end portion of the first electrical lead.

The plurality of first protrusions may be spaced apart from one another in a width direction of the first electrode lead.

The second electrode lead may include a plurality of second protrusions extending from the longitudinal end portion of the second electrode lead.

The plurality of second protrusions may be spaced apart from one another in a width direction of the second electrode lead.

Each of the plurality of second protrusions may be located in a space formed between adjacent first protrusions of the plurality of first protrusions.

The welding portion may be formed on the plurality of first protrusions and the plurality of second protrusions.

A length of each of the plurality of first protrusions and the plurality of second protrusions may correspond to a width of the bus bar.

The welding portion may be formed along the entire longitudinal direction of each first protrusion and second protrusion of the plurality of first protrusions and the plurality of second protrusions.

The bus bar may be located between the pair of lead slits.

A surface of the longitudinal end portion of the first electrode lead and a surface of the longitudinal end portion of the second electrode lead may form a same plane.

A battery pack according to an embodiment of the present disclosure includes the battery module according to an embodiment of the present disclosure.

A vehicle according to an embodiment of the present disclosure includes the battery module according to an embodiment of the present disclosure.

Advantageous Effects

According to an aspect of the present disclosure, when battery cells are electrically connected to one another, the amount of a conductive metal material required to manufacture a bus bar may be minimized by minimizing a coupling area between the bus bar and an electrode lead while maintaining a sufficient coupling force, and thus battery module manufacturing costs may be reduced.

Also, according to another aspect of the present disclosure, a length of a path of current flowing between a pair of electrode leads electrically connected through one bus bar may be significantly reduced, and thus energy loss due to an increase in resistance may be prevented.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

Figure 2:
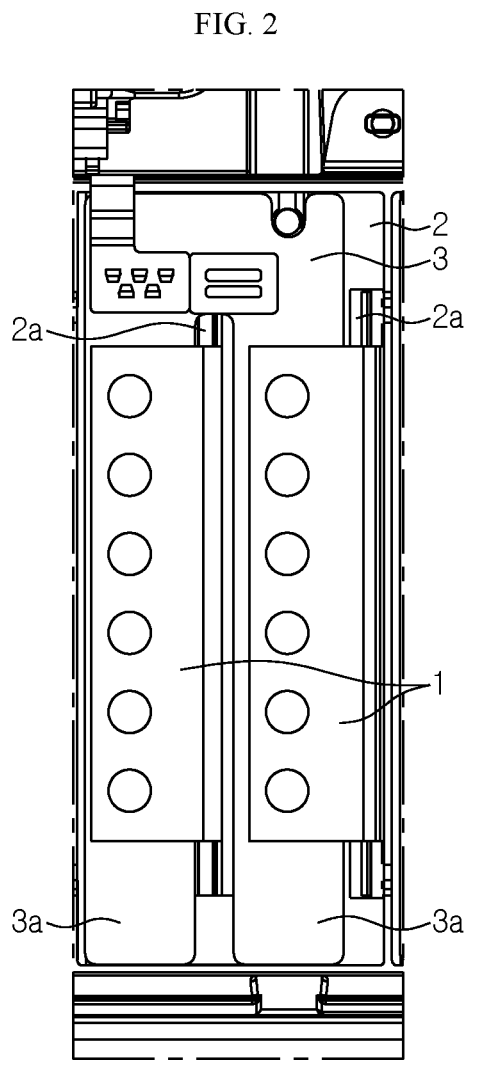

FIGS. 1 and 2 are views illustrating a conventional battery module structure.

FIG. 4 is a view illustrating a cell stack of the present disclosure.

BEST MODE

Figure 1:
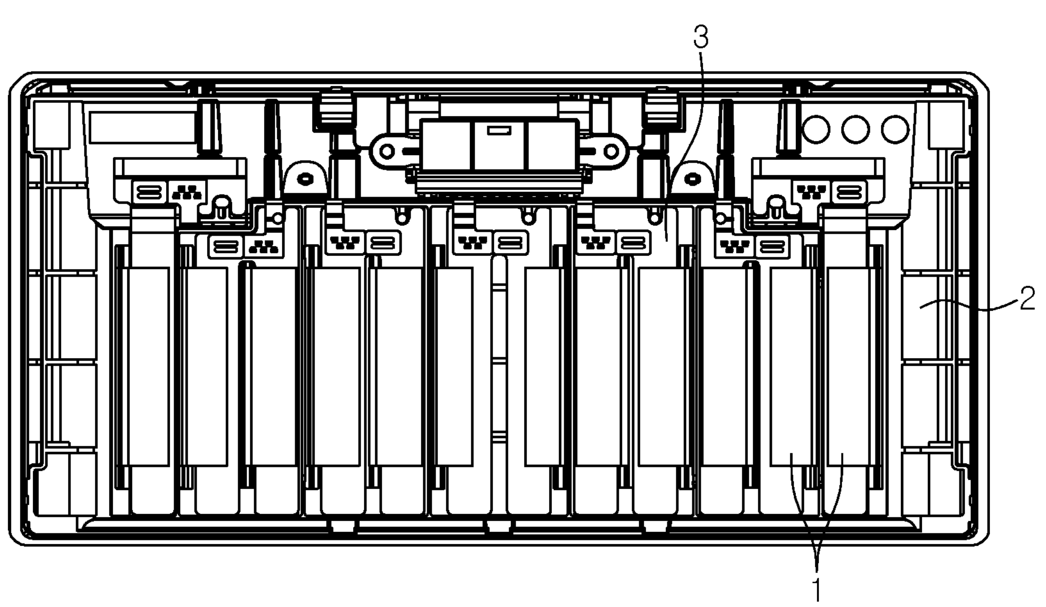
Figure 3:
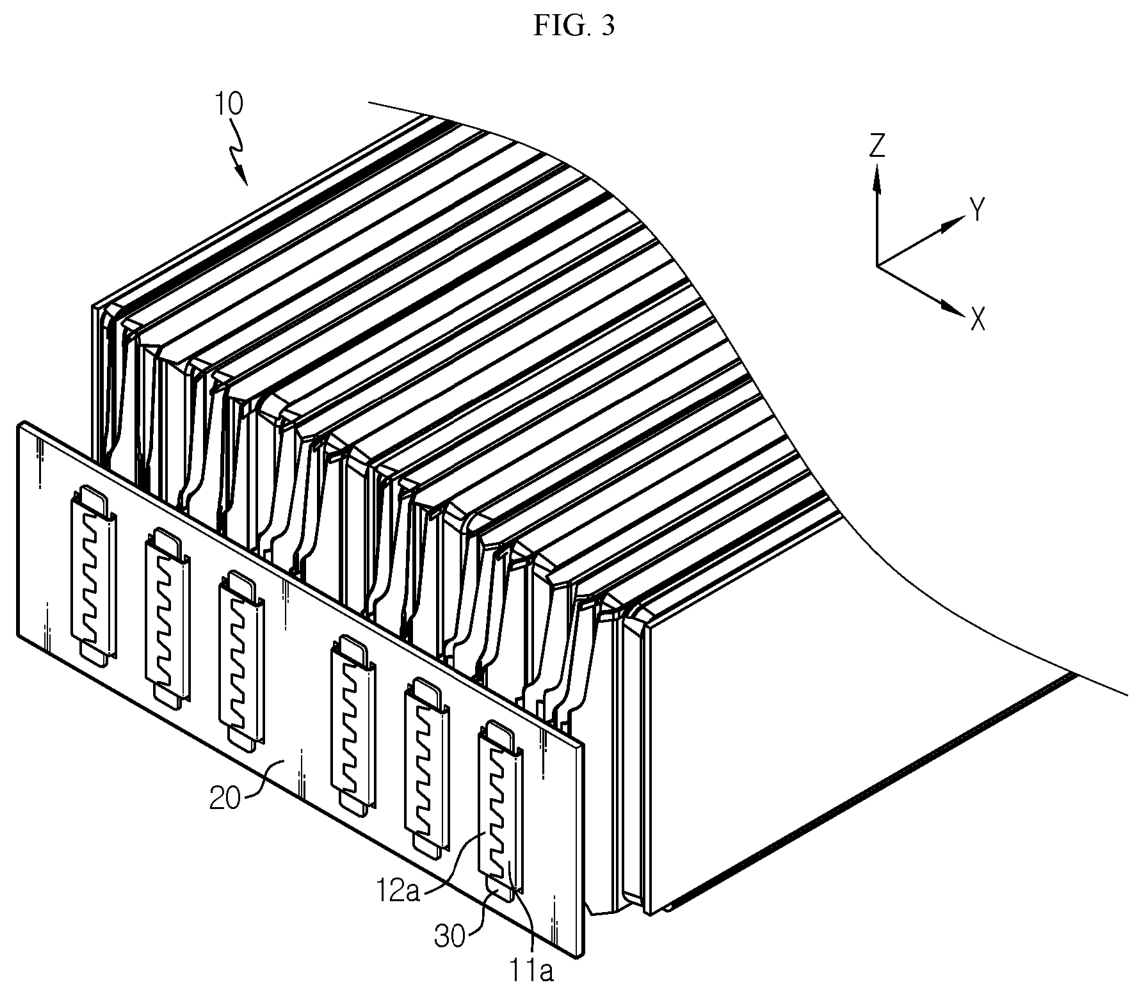
FIG. 3 is a view illustrating a battery module according to an embodiment of the present disclosure.
Figure 5:
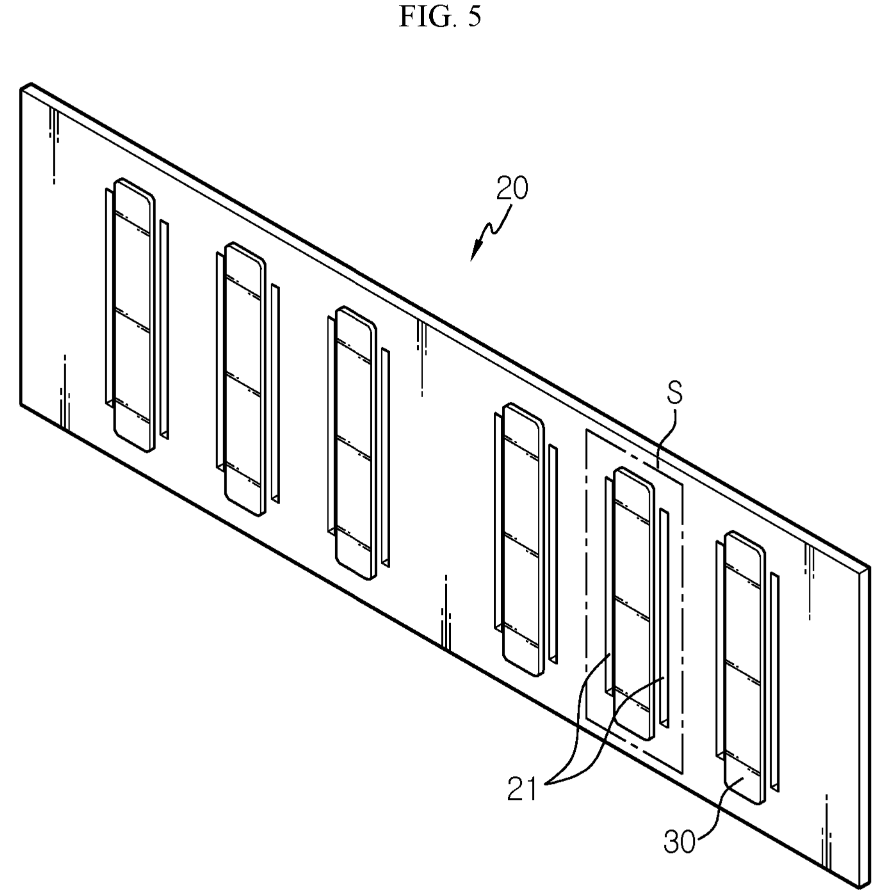
FIG. 5 is a view illustrating a bus bar frame and a bus bar of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the present disclosure, so it should be understood that other equivalents and modifications could be made thereto without departing from the scope of the present disclosure.

Hereinafter, a battery module according to an embodiment of the present disclosure will be described with reference to FIGS. 3 through 7. Referring to FIGS. 3 through 7, a battery module according to an embodiment of the present disclosure includes a cell stack 10, a bus bar frame 20, and a bus bar 30.

The cell stack 10 is formed by stacking a plurality of battery cells including a first battery cell 11 and a second battery cell 12 adjacent to each other. The battery cells constituting the cell stack 10 may be, for example, pouch-type battery cells, and in this case, a pair of electrode leads having different polarities are drawn out in opposite directions.

The first battery cell 11 and the second battery cell 12 facing each other are stacked so that a first electrode lead 11*a* extending to a side in a longitudinal direction of the first battery cell 11 and a second electrode lead 12*a* extending to a side in a longitudinal direction of the second battery cell 12 adjacent to the first battery cell 11 and adjacent to the first electrode lead 11*a* have opposite polarities.

Such a stacked arrangement of the cell stack 10 is to connect the plurality of battery cells including the first battery cell 11 and the second battery cell 12 in series. That is, the first battery cell 11 and the second battery cell 12 adjacent to each other are connected to each other in series by electrically connecting the first electrode lead 11*a* and the second electrode lead 12*a* having different polarities.

The bus bar frame 20 has a substantially rectangular plate shape, and is located on one side and on the other side in a longitudinal direction (direction parallel to a Y-axis) of the cell stack 10. It is preferable that the bus bar frame 20 is formed of a non-conductive material for insulation between a plurality of bus bars 30 described below. One pair of bus bar frames 20 are provided to connect the plurality of battery cells constituting the cell stack 10 in series.

The bus bar frame 20 includes at least one lead connection area S. When a plurality of lead connection areas S are provided, the plurality of lead connection areas S are spaced apart from one another in a longitudinal direction (parallel to an X-axis) of the bus bar frame 20. A pair of lead slits 21 are formed in each of the lead connection area S. Each of the lead slits 21 has a length corresponding to a width of one electrode lead and a width corresponding to a thickness of the electrode lead so that the electrode lead passes through the lead slit 21, and the lead slit 21 extends in a width direction (direction parallel to a Z-axis) of the bus bar frame 20. Also, the pair of lead slits 21 are spaced apart from each other in the longitudinal direction (direction parallel to the X-axis) of the bus bar frame 20.

The bus bar 30 is formed of a conductive metal, and as many bus bars 30 as the lead connection areas S are provided. The bus bar 30 is fixedly provided between the pair of lead slit 21 located in the lead connection area S. The bus bar 30 longitudinally extends in the width direction (direction parallel to the Z-axis) of the bus bar frame 20.

The first electrode lead 11*a* and the second electrode lead 12*a* extending parallel to each other in the same direction are located to correspond, in a one-to-one manner, to the pair of lead slits 21 formed in one lead connection area S.

Figure 6:
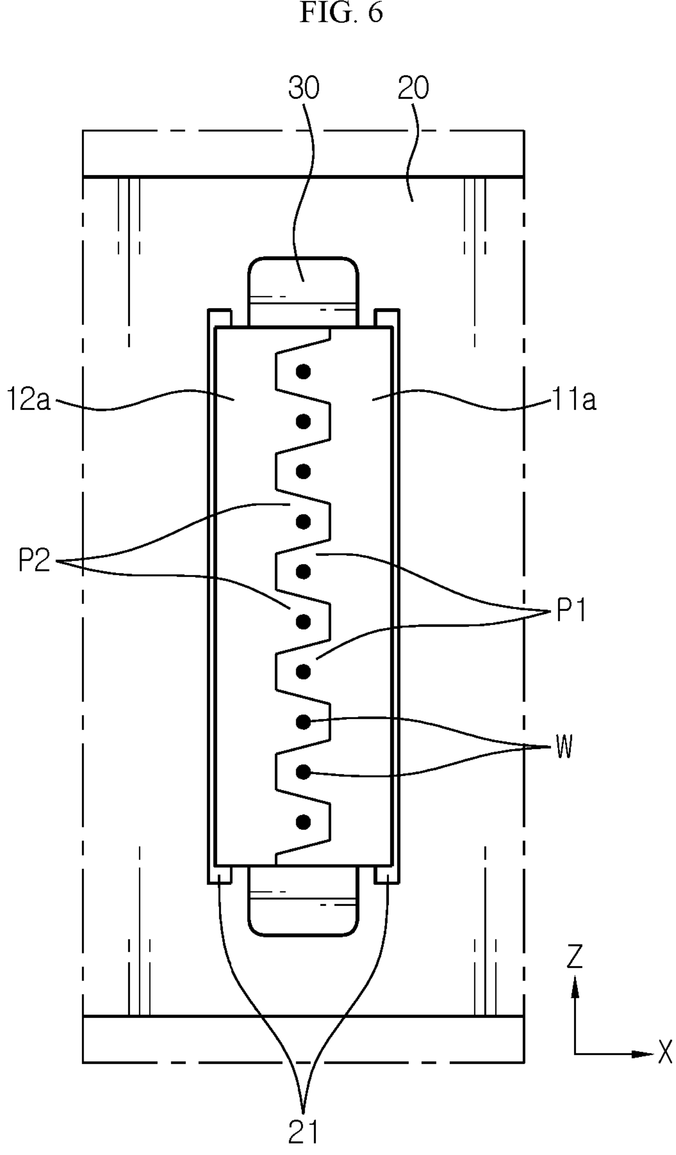
FIG. 6 is an enlarged partial view illustrating a coupling portion between a pair of electrode leads and a bus bar in a battery module according to an embodiment of the present disclosure.

Referring to FIG. 6, the first electrode lead 11*a* passes through the lead slit 21 and is bent toward the bus bar 30. Likewise, the second electrode lead 12*a* passes through the lead slit 21 and is bent toward the bus bar 30 and the first electrode lead 11*a*.

The first electrode lead 11*a* and the second electrode lead 12*a* are located on the bus bar 30 in a state where longitudinal end portions of the first electrode lead 11*a* and the second electrode lead 12*a* are engaged with each other. In this case, a surface of the longitudinal end portion of the first electrode lead 11*a* and a surface of the longitudinal end portion of the second electrode lead 12*a* may form the same plane. That is, the first electrode lead 11*a* and the second electrode lead 12*a* may not overlap each other. According to this coupling structure, the risk of welding failure caused by an increase in a thickness of an object to be welded during welding between the first electrode lead 11*a* and the bus bar 30 and welding between the second electrode lead 12*a* and the bus bar 30 may be greatly reduced. A welding portion W for bonding to the bus bar 30 is formed in a region where the first electrode lead 11*a* and the second electrode lead 12*a* are engaged with each other. That is, each of the first electrode lead 11*a* and the second electrode lead 12*a* is welded to the bus bar 30.

For engagement between the first electrode lead 11*a* and the second electrode lead 12*a*, the first electrode lead 11*a* includes a plurality of first protrusions P1 extending from the longitudinal end portion, and the second electrode lead 12*a* includes a plurality of second protrusions P2 extending from the longitudinal end portion. The first protrusions P1 may extend from the longitudinal end portion of the first electrode lead 11*a*, in a longitudinal direction of the first electrode lead 11*a*. Likewise, the second protrusions P2 may extend from the longitudinal end portion of the second electrode lead 12*a*, in a longitudinal direction of the second electrode lead 12*a*. Accordingly, the first protrusions P1 and the second protrusions P2 may extend toward each other. The plurality of first protrusions P1 are spaced apart from one another in a width direction of the first electrode lead 11*a*, and likewise, the plurality of second protrusions P2 are spaced apart from one another in a width direction of the second electrode lead 12*a*. Each of the plurality of second protrusions P2 is located to fill a space formed between adjacent first protrusions P1. In this case, the first protrusion P1 and the second protrusion P2 may be in close in contact with each other so that surfaces of the first protrusion P1 and the second protrusion P2 form the same plane.

The welding portion W may be formed on the plurality of first protrusions P1 and the plurality of second protrusions P2. Although the welding portion W is formed in a dot shape only on a portion of the entire area of each of the first protrusion P1 and the second protrusion P2 in FIG. 6, this is merely an example. The welding portion W may be formed over the entire area where the first electrode lead 11*a* and the bus bar 30 overlap each other and the entire area where the second electrode lead 12*a* and the bus bar 30 overlap each other, in order to firmly fix the first electrode lead 11*a* and the second electrode lead 12*a* to the bus bar 30. Alternatively, for ease of welding, the welding portion W may be longitudinally formed in a longitudinal direction (direction parallel to the Z-axis) of the bus bar 30 to pass through a central portion in a longitudinal direction (direction parallel to the X-axis) of the first protrusion P1 and a central portion in a longitudinal direction (direction parallel to the X-axis) of the second protrusion P2.

When viewed from the top of the bus bar 30, each of the first protrusion 11*a* and the second protrusion 12*a* may have a trapezoidal shape as shown in FIG. 6, or may have a rectangular shape, a triangular shape, or a shape having a round longitudinal end portion.

Figure 7:
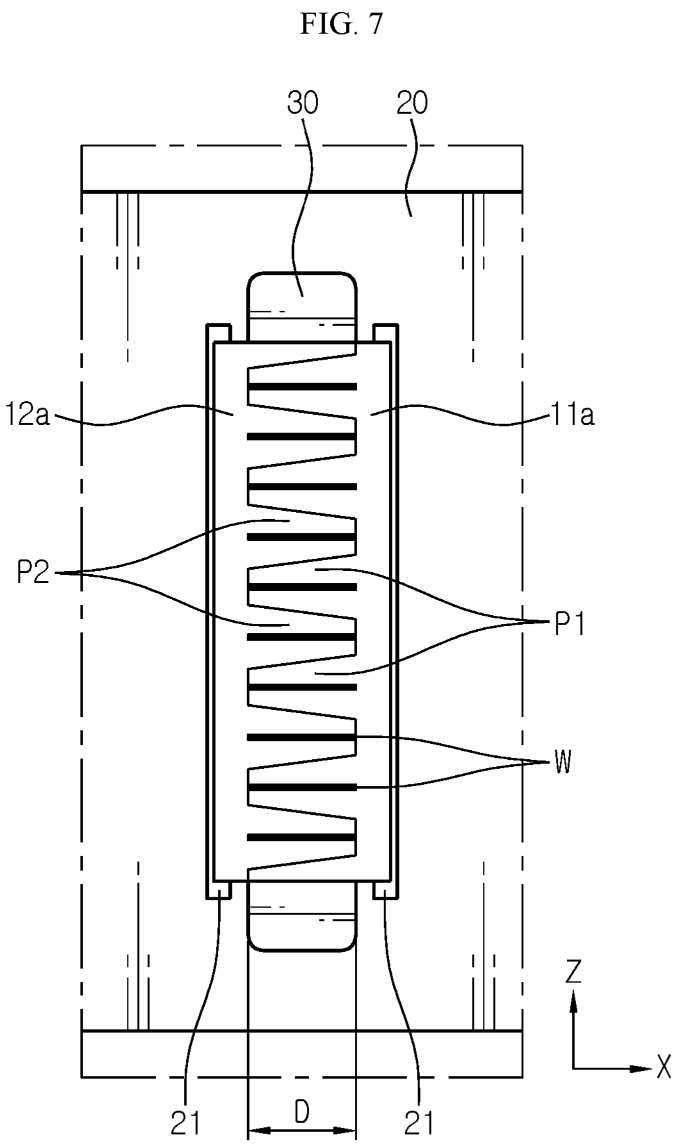
FIG. 7 is an enlarged partial view illustrating a coupling portion between a pair of electrode leads and a bus bar in a battery module according to another embodiment of the present disclosure.

Referring to FIG. 7, in order to increase a coupling force between the first electrode lead 11*a* and the bus bar 30 and a coupling force between the second electrode lead 12*a* and the bus bar 30, each of the first protrusion P1 and the second protrusion P2 may be formed so that a length D of each of the first protrusion P1 and the second protrusion P2 corresponds to a width of the bus bar 30. That is, the length D of each of the first protrusion P1 and the second protrusion P2 may be substantially the same as the width of the bus bar 30. In this case, it is preferable that the welding portion W is formed along the entire longitudinal direction (direction parallel to the X-axis) of the first protrusion P1 and along the entire longitudinal direction of the second protrusion P2.

According to the battery module according to the present disclosure as described above, because one pair of electrode leads 11*a*, 12*a* are located on the bus bar 30 in a state where the pair of electrode leads 11*a*, 12*a* are engaged with each other and the welding portion W is formed in a region where the pair of electrode leads 11*a*, 12*a* are engaged with each other, a width of the bus bar 30 may be minimized and a width of a coupling area between the electrode leads 11*a*, 12*a* and the bus bar 30 may not be reduced. Accordingly, costs of materials required to manufacture the bus bar 30 formed of a conductive metal material may be minimized and a coupling force between the electrode leads 11*a*, 12*a* and the bus bar 30 may be secured, thereby improving productivity and product quality.

A battery pack according to an embodiment of the present disclosure includes at least one battery module according to the present disclosure as described above. Also, a vehicle according to an embodiment of the present disclosure includes at least one battery module according to the present disclosure as described above or at least one battery pack according to an embodiment of the present disclosure.

The present disclosure has been described in detail. However, it should be understood that the detailed description and specific examples, while indicating preferred embodiments of the present disclosure, are given by way of illustration only, since various changes and modifications within the scope of the present disclosure defined by the appended claims will become apparent to one of ordinary skill in the art from this detailed description.

What is claimed is:

1. A battery module comprising:

a cell stack comprising a first battery cell comprising a first electrode lead and a second battery cell comprising a second electrode lead, the second battery cell being adjacent to the first battery cell;

a bus bar frame comprising a pair of lead slits through which the first electrode lead and the second electrode lead pass, respectively; and a bus bar fixed to the bus bar frame, wherein the first electrode lead and the second electrode lead are located on the bus bar in a state where a longitudinal end portion of the first electrode lead and a longitudinal end portion of the second electrode lead are engaged with each other without overlapping each other, and a welding portion for bonding the first electrode lead and the second electrode lead to the bus bar is formed in a region where the first electrode lead and the second electrode lead are engaged with each other, wherein a length of the bus bar is greater than a length of the pair of lead slits, wherein the welding portion is provided in plural, wherein the plurality of welding portions are arranged in a longitudinal direction of the bus bar and are separated from each other in the longitudinal direction, wherein the first electrode lead comprises a plurality of first protrusions extending from the longitudinal end portion of the first electrode lead, wherein the second electrode lead comprises a plurality of second protrusions extending from the longitudinal end portion of the second electrode lead, wherein each of the plurality of first protrusions is located in a space formed between adjacent two second protrusions of the plurality of second protrusions, and each of the plurality of second protrusions is located in a space formed between adjacent two first protrusions of the plurality of first protrusions, wherein the plurality of welding portions are formed on the plurality of first protrusions and the plurality of second protrusions respectively and are contained within the plurality of first protrusions and the plurality of second protrusions respectively so that each welding portion contained in each first protrusion and each welding portion contained in each second protrusion are arranged in an alternating arrangement in the longitudinal direction of the bus bar.

2. The battery module of claim 1, wherein the plurality of first protrusions are spaced apart from one another in a width direction of the first electrode lead.

3. The battery module of claim 1, wherein the plurality of second protrusions are spaced apart from one another in a width direction of the second electrode lead.

4. The battery module of claim 1, wherein a length of each of the plurality of first protrusions and the plurality of second protrusions corresponds to a width of the bus bar.

5. The battery module of claim 4, wherein the plurality of welding portions are formed along an entire longitudinal direction of each of the plurality of first protrusions and the plurality of second protrusions.

6. The battery module of claim 1, wherein the bus bar is located between the pair of lead slits.

7. The battery module of claim 1, wherein a surface of the longitudinal end portion of the first electrode lead and a surface of the longitudinal end portion of the second electrode lead form a same plane.

8. A battery pack comprising the battery module according to claim 1.

9. A vehicle comprising the battery module according to claim 1.

10. The battery module of claim 1, wherein the bus bar and the pair of lead slits are arranged extending in a width direction of the bus bar frame.

11. The battery module of claim 1, wherein the length of the bus bar is greater than lengths of the longitudinal end portion of the first electrode lead and the longitudinal end portion of the second electrode lead.

12. The battery module of claim 1, wherein the bus bar frame includes at least one lead connection area that includes the pair of lead slits, and wherein an entire surface of the bus bar frame located between the pair of lead slits in the at least one lead connection area is coplanar with a surface of the bus bar frame located outside of the at least one lead connection area.

13. The battery module of claim 1, wherein the bus bar includes a first side and a second side that is opposite to the first side, wherein the first side of the bus bar directly contacts the first electrode lead and the second electrode lead without being exposed by the longitudinal end portion of the first electrode lead and the longitudinal end portion of the second electrode lead, and wherein the second side of the bus bar directly contacts the bus bar frame so that the bus bar is interposed between the bus bar frame and the longitudinal end portions of the first and second electrode leads.

14. The battery module of claim 1, wherein each of the plurality of welding portions is in a dot shape or a bar shape.

* * * * *